United States Patent
D'Amico et al.

(10) Patent No.: US 9,727,832 B2
(45) Date of Patent: Aug. 8, 2017

(54) METHODS FOR GENERATING A WORK-ORDER IN REAL TIME AND DEVICES THEREOF

(71) Applicant: Profit Strategies, Inc., Rochester, NY (US)

(72) Inventors: James W. D'Amico, Fairport, NY (US); Paul M. Baccaro, Rochester, NY (US); Matthew Smith, Fairport, NY (US)

(73) Assignee: Profit Strategies, Inc., Rochester, NY (US)

( * ) Notice: Subject to any disclaimer, the term of this patent is extended or adjusted under 35 U.S.C. 154(b) by 469 days.

(21) Appl. No.: 14/030,887

(22) Filed: Sep. 18, 2013

(65) Prior Publication Data
US 2014/0278628 A1    Sep. 18, 2014

(51) Int. Cl.
*G06Q 10/06*    (2012.01)
*G06Q 30/02*    (2012.01)
*G06Q 30/06*    (2012.01)

(52) U.S. Cl.
CPC . *G06Q 10/06311* (2013.01); *G06Q 10/06313* (2013.01); *G06Q 30/0283* (2013.01); *G06Q 30/0611* (2013.01)

(58) Field of Classification Search
CPC .................................................. G06Q 30/0283
USPC ......................................................... 705/7.13
See application file for complete search history.

(56) References Cited

U.S. PATENT DOCUMENTS

| | | | |
|---|---|---|---|
| 5,918,219 A * | 6/1999 | Isherwood | G06Q 10/04 235/378 |
| 7,117,162 B1 * | 10/2006 | Seal | G06Q 10/06 705/7.15 |
| 8,494,581 B2 | 7/2013 | Barbosa et al. | |
| 2002/0026394 A1 * | 2/2002 | Savage | G06Q 20/02 705/34 |
| 2002/0032613 A1 * | 3/2002 | Buettgenbach | G06Q 10/08 705/26.8 |
| 2002/0055358 A1 | 5/2002 | Herbert | |
| 2002/0087318 A1 | 7/2002 | Krishnamurthy et al. | |
| 2002/0143598 A1 * | 10/2002 | Scheer | G06Q 10/06316 705/7.26 |
| 2002/0143655 A1 | 10/2002 | Elston et al. | |

(Continued)

FOREIGN PATENT DOCUMENTS

| WO | 2012/162736 A1 | 12/2012 |
|---|---|---|
| WO | 2012162736 A1 | 12/2012 |

OTHER PUBLICATIONS

International Search Report for International Patent Application No. PCT/US2014/056311 (mailed: Dec. 31, 2014).

(Continued)

*Primary Examiner* — Beth V Boswell
*Assistant Examiner* — Hafiz Kassim
(74) *Attorney, Agent, or Firm* — LeClairRyan, a Professional Corporation

(57) ABSTRACT

A method, non-transitory computer readable medium, and a mobile computing device comprises obtaining one or more databases from one or more sources; identifying one or more items in the obtained one or more databases; determining a fee for the identified one or more items based on one or more fee setting parameters; and generating a work-order in real-time based on the determined fee.

27 Claims, 16 Drawing Sheets

(56) References Cited

U.S. PATENT DOCUMENTS

| | | | |
|---|---|---|---|
| 2002/0156692 A1* | 10/2002 | Squeglia | G06Q 10/087 705/26.81 |
| 2002/0156695 A1* | 10/2002 | Edwards | G06Q 30/04 705/26.2 |
| 2003/0120677 A1* | 6/2003 | Vernon | G06Q 10/08 |
| 2003/0158784 A1* | 8/2003 | Shaver | G06Q 30/02 705/14.1 |
| 2003/0167238 A1* | 9/2003 | Zeif | G05B 23/0267 705/400 |
| 2003/0212589 A1* | 11/2003 | Kish | G06Q 30/02 705/7.16 |
| 2004/0117154 A1* | 6/2004 | Lane, III | G06Q 10/06 702/184 |
| 2005/0131596 A1 | 6/2005 | Cherrington et al. | |
| 2005/0149436 A1* | 7/2005 | Elterich | G06Q 20/10 705/39 |
| 2006/0155616 A1 | 7/2006 | Moore et al. | |
| 2006/0259479 A1 | 11/2006 | Dai | |
| 2006/0287954 A1 | 12/2006 | DeWitt et al. | |
| 2007/0083574 A1 | 4/2007 | Garin, Jr. et al. | |
| 2007/0136106 A1* | 6/2007 | Hart | G06Q 10/0875 705/4 |
| 2007/0168344 A1* | 7/2007 | Brinson | G06F 17/30648 |
| 2007/0288159 A1* | 12/2007 | Skelton | G01C 15/00 455/556.2 |
| 2008/0288539 A1 | 11/2008 | Jacobs | |
| 2009/0125454 A1* | 5/2009 | Wartel | G06Q 30/0283 705/400 |
| 2010/0191611 A1 | 7/2010 | Brio | |
| 2011/0015963 A1 | 1/2011 | Chafle et al. | |
| 2011/0022503 A1 | 1/2011 | Parker-Yules | |
| 2011/0054978 A1 | 3/2011 | Mohil | |
| 2011/0276886 A1* | 11/2011 | Hall | G06Q 10/06 715/734 |
| 2012/0232969 A1* | 9/2012 | Fadell | G06Q 10/20 705/14.4 |
| 2012/0284077 A1 | 11/2012 | Xiao et al. | |
| 2012/0330849 A1* | 12/2012 | Nielsen | G06Q 10/06 705/301 |
| 2013/0173324 A1* | 7/2013 | Lo | G06Q 10/06 705/7.15 |
| 2014/0129277 A1* | 5/2014 | Lavrov | G06F 17/30241 705/7.15 |
| 2014/0172479 A1* | 6/2014 | Gallagher | G06Q 10/063114 705/7.15 |

OTHER PUBLICATIONS

Extended PCT Search Report for Corresponding PCT Patent Application PCT/US14/56311, pp. 1-9, (Date of Mailing: Dec. 31, 2014).
Eyal N., "How to Manufacture Desire: An Intro to the Desire Engine", Nir and Far., 2013, (http://www.nirandfar.com/2012/03/how-to-manufacture-desire.html).
Extended PCT Search Report for Corresponding PCT Patent Application PCT/US14/56311, pp. 1-9, (Date of Mailing: Feb. 27, 2017).

* cited by examiner

METHODS FOR GENERATING A WORK-ORDER IN REAL TIME AND DEVICES THEREOF

FIELD OF THE INVENTION

The present invention relates to a method and device for generating a work-order in real time, and is generally suitable for any type of service provider who utilizes new equipment or replacement parts in delivering a service to a customer.

BACKGROUND OF THE INVENTION

Service providers, such as electricians, plumbers, heating/cooling contractors who provide installation and repair services for commercial and/or residential customers, are tasked with diagnosing problems raised by their customers, initiating the repair service, completing the service, and completing the financial transaction associated with the service. One difficulty that these service providers have is the ability to efficiently estimate costs for parts and repair services. The typical way of performing cost estimations is a highly manual endeavor, although certain individual contractors or their employers may have standard repair services with flat rate charges. Estimating the cost of parts, which are subject to price variability levied by the distributors that contractors use, adds further complexity to the process. As a result of existing cost estimation systems being manual, inefficiencies naturally occur, and much time and effort is wasted in generating a work order with repair service and parts fee estimates, and then closing out a transaction with a customer.

It would be desirable, therefore, to develop a device and method that allows a service provider to efficiently generate a work order in the field, in real time, using routinely updated parts and service fees, present the work order to the customer for immediate approval, initiate and complete the agreed upon service, and optionally complete payment transactions for services rendered. Increased efficiencies on the transactional side of these services will allow for decreased time allocation to the transaction and, therefore, increased profitability. Further, through the use of flat-rate pricing and automated, scaled parts markup during work-order generation, increased profitability can be achieved.

The present invention is directed to overcoming these and other deficiencies in the art.

SUMMARY OF THE INVENTION

A first aspect of the present invention relates to a method for generating a work-order in real time. The method includes the steps of obtaining, by a mobile computing device, one or more databases from one or more sources; identifying, by the mobile computing device, one or more items in the obtained one or more databases; determining, by the mobile computing device, a fee for the identified one or more items based on one or more fee setting parameters; and generating by the mobile computing device a finalized work-order in real-time based on the determined fee.

A second aspect of the invention also relates to a method for generating a work-order in real time. The method includes the steps of identifying, by a mobile computing device, one or more databases from one or more sources; identifying, by the mobile computing device, one or more items in the identified one or more databases; determining, by the mobile computing device, a fee for the identified one or more items based on one or more fee setting parameters; and generating, by the mobile computing device, a finalized work-order in real-time based on the determined fee. The method further includes one or more of the following steps: determining, by the mobile computing device, a fee adjustment for one or more determined fees and applying the determined fee adjustment to one or more determined fees; determining, by the mobile computing device, a discount value for one or more determined fees and applying the determined discount value to the one or more determined fees; applying, by the mobile computing device, a custom label to a user account associated with the mobile computing device, whereby one or more process steps of the method is modified based on the applied custom label, either before or after generating the work-order; or determining, by the mobile computing device, whether the generated work order reduces a user account balance to below a threshold level.

A third aspect of the present invention relates to a non-transitory computer readable medium having stored thereon instructions for generating a work-order in real time, and including machine executable code which when executed by at least one processor, causes the processor to perform steps including: obtaining one or more databases from one or more sources; identifying one or more items in the obtained one or more databases; determining a fee for the identified one or more items based on one or more fee setting parameters; and generating a finalized work-order in real-time based on the determined fee.

A fourth aspect of the present invention relates to a non-transitory computer readable medium having stored thereon instructions for generating a work-order in real time, and including machine executable code which when executed by at least one processor, causes the processor to perform steps including: identifying one or more databases from one or more sources; identifying one or more items in the identified one or more databases; determining a fee for the identified one or more items based on one or more fee setting parameters; and generating a finalized work-order in real-time based on the determined fee. The processor is also caused to perform one or more of the following steps: determining a fee adjustment for one or more determined fees and applying the determined fee adjustment to one or more determined fees; determining a discount value for one or more determined fees and applying the determined discount value to the one or more determined fees; applying a custom label to a user account associated with a mobile computing device, whereby one or more process steps of the method is modified based on the applied custom label, either before or after generating the work-order; or determining, by the mobile computing device, whether the generated work order reduces a user account balance to below a threshold level.

A fifth aspect of the present invention relates to a mobile computing device that includes one or more processors and a memory, wherein the memory is coupled to the one or more processors which are configured to execute programmed instructions stored in the memory including: obtaining one or more databases from one or more sources; identifying one or more items in the obtained one or more databases; determining a fee for the identified one or more items based on one or more fee setting parameters; and generating a finalized work-order in real-time based on the determined fee.

A sixth aspect of the present invention relates to a mobile computing device that includes one or more processors and a memory, wherein the memory is coupled to the one or more processors which are configured to execute programmed instructions stored in the memory including: identifying one or more databases from one or more sources; identifying one or more items in the identified one or more databases; determining a fee for the identified one or more items based on one or more fee setting parameters; and generating a finalized work-order in real-time based on the determined fee. The programmed instructions stored in the memory further include one or more of: determining a fee adjustment for one or more determined fees and applying the determined fee adjustment to one or more determined fees; determining a discount value for one or more determined fees and applying the determined discount value to the one or more determined fees; applying a custom label to a user account associated with a mobile computing device, whereby one or more process steps of the method is modified based on the applied custom label, either before or after generating the work-order; or determining, by the mobile computing device, whether the generated work order reduces a user account balance to below a threshold level.

BRIEF DESCRIPTION OF THE DRAWINGS

FIG. 6A is an exemplary flowchart illustrating a method for parts reordering, FIG. 6B illustrates one embodiment for distributor interface with the mobile computer device for automated parts reordering, and FIG. 6C illustrates the relationship between multiple technicians employed by a single contractor and their ability to access parts from one or more distributors and their outlets;

DETAILED DESCRIPTION OF THE INVENTION

Figure 1:
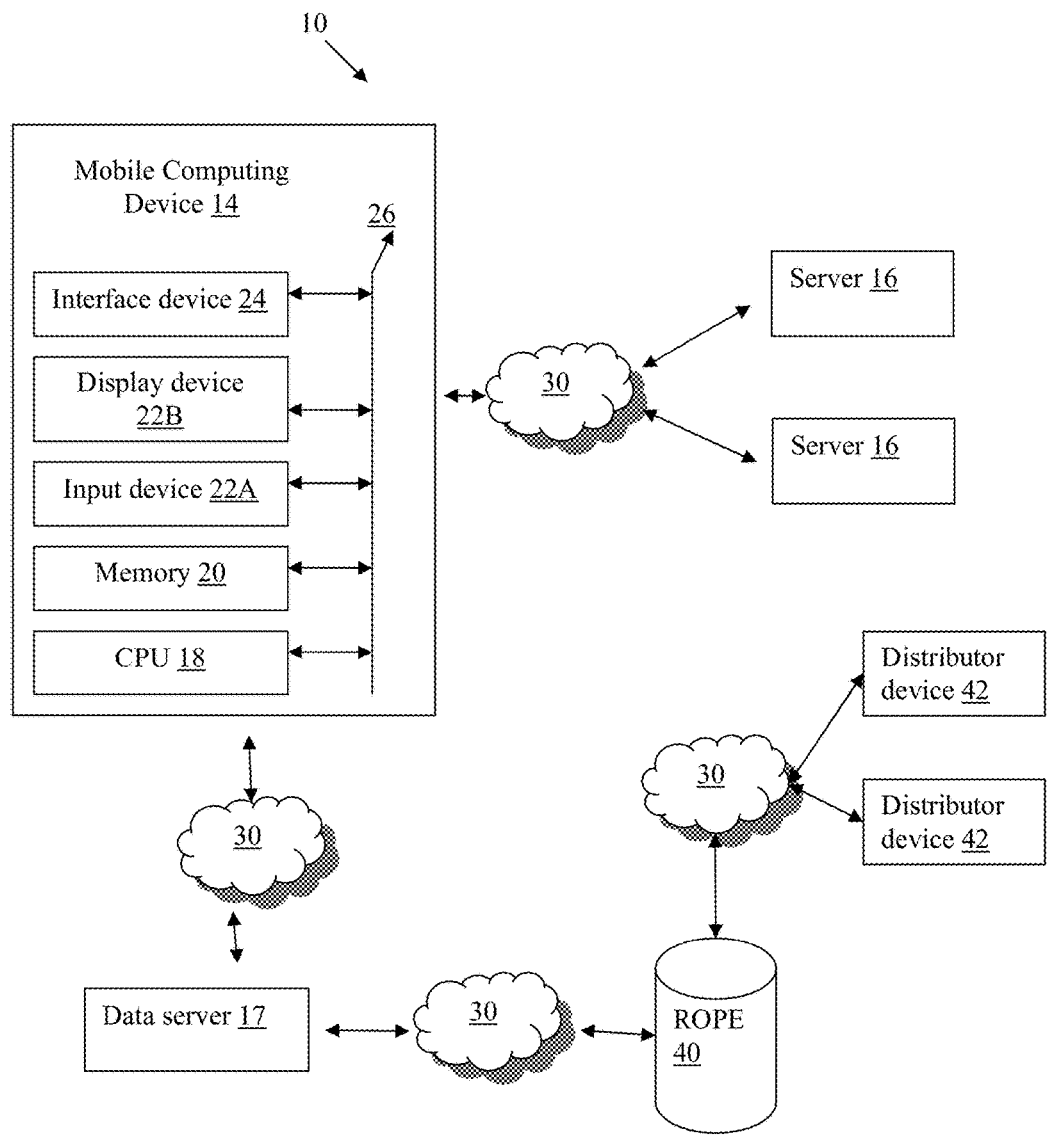
FIG. 1 is a block diagram of an exemplary mobile computing device for generating work-order in real-time.

An exemplary environment 10 including a mobile computing device 14 and plurality of servers 16 for generating a work-order in real-time is illustrated in FIG. 1. As used herein, "generating a work-order" is intended to encompass the completion of a finalized work-order that can be presented to a customer for review and then approved by the customer before work is commenced. This is the end result of a process of opening a new work-order, and populating the work-order with one or more service fees and/or parts fees, as appropriate. This process is described in greater detail below.

The exemplary environment 10 includes the mobile computing device 14 and the servers 16, data server 17, Re-order parts electronically (ROPE) database 40 and distributor devices 42, which are coupled together by a communication network 30, although the environment can include other types and numbers of devices, components, elements, and communication networks 30 in other topologies and deployments. While not shown, the exemplary environment 10 may include additional components, such as databases, etc., which are well known to those of ordinary skill in the art and thus will not be described here. This technology provides a number of advantages including providing more effective methods, non-transitory computer readable medium and devices for generating a work-order in real time.

The mobile computing device 14 assists with generating a work-order in real time as illustrated and described with the examples herein, although mobile computing device 14 may perform other types and numbers of functions. The mobile computing device 14 includes at least one CPU/processor 18, memory 20, input device 22A and display device 22B, and communication interface 24, which are all coupled together by bus 26, although mobile computing device 14 may comprise other types and numbers of elements such as an antenna for receiving analog or digital signals in other configurations.

Processor(s) 18 may execute one or more computer-executable instructions stored in the memory 20 for the methods illustrated and described with reference to the examples herein, although the processor(s) can execute other types and numbers of instructions and perform other types and numbers of operations. The processor(s) 18 may comprise one or more central processing units ("CPUs") or general purpose processors with one or more processing cores, such as AMD® processor(s), although other types of processor(s) could be used (e.g., Intel®).

Figure 2A:
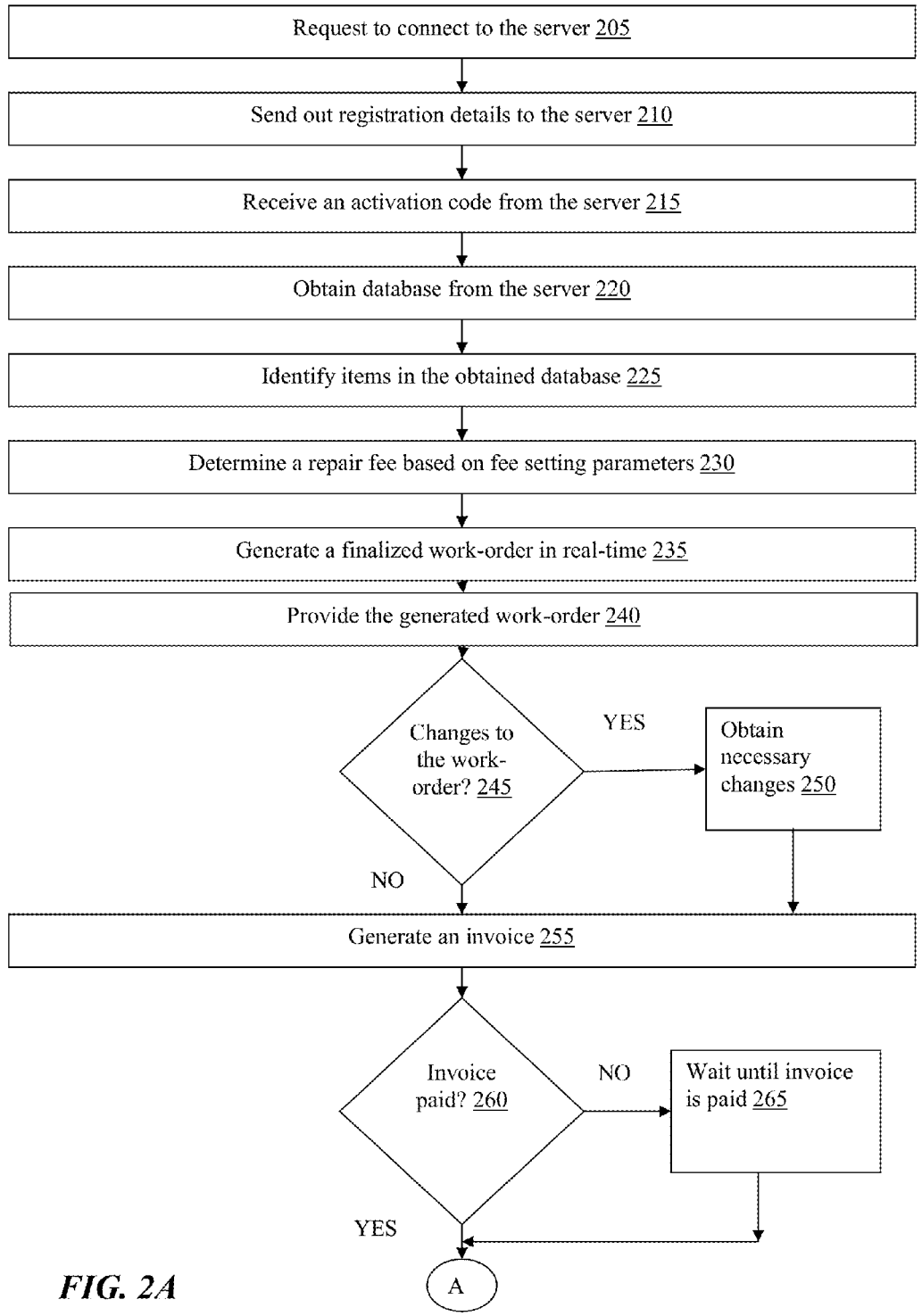
FIGS. 2A-2B are exemplary flowcharts for generating a work-order in real-time.
Figure 2B:
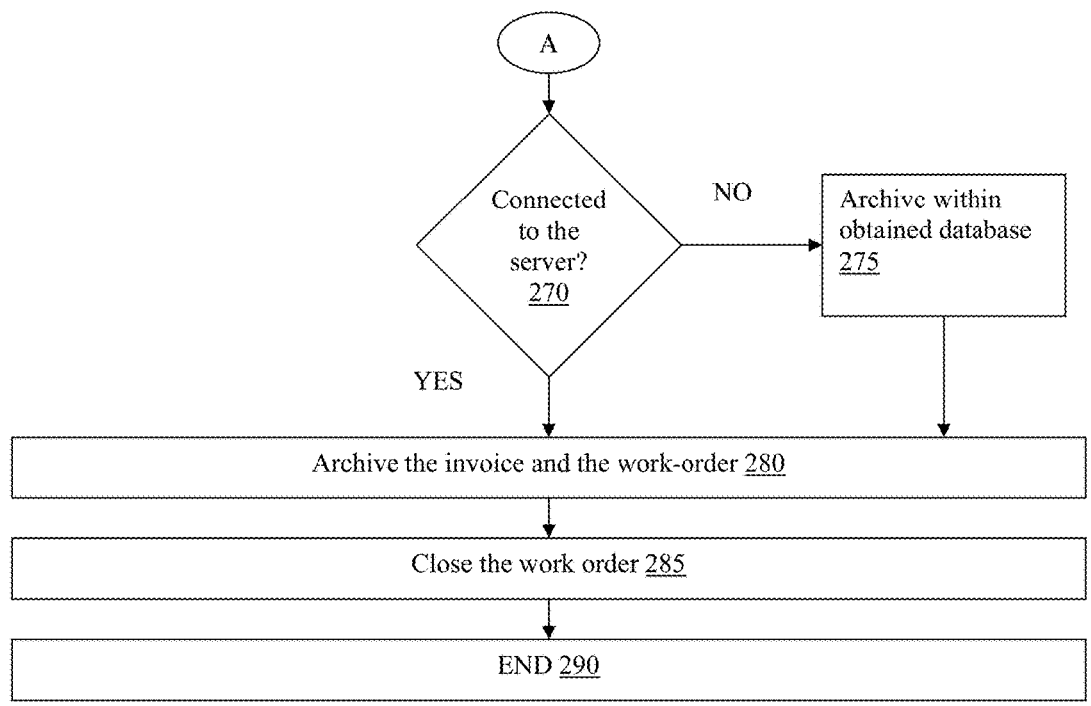
Figure 3:
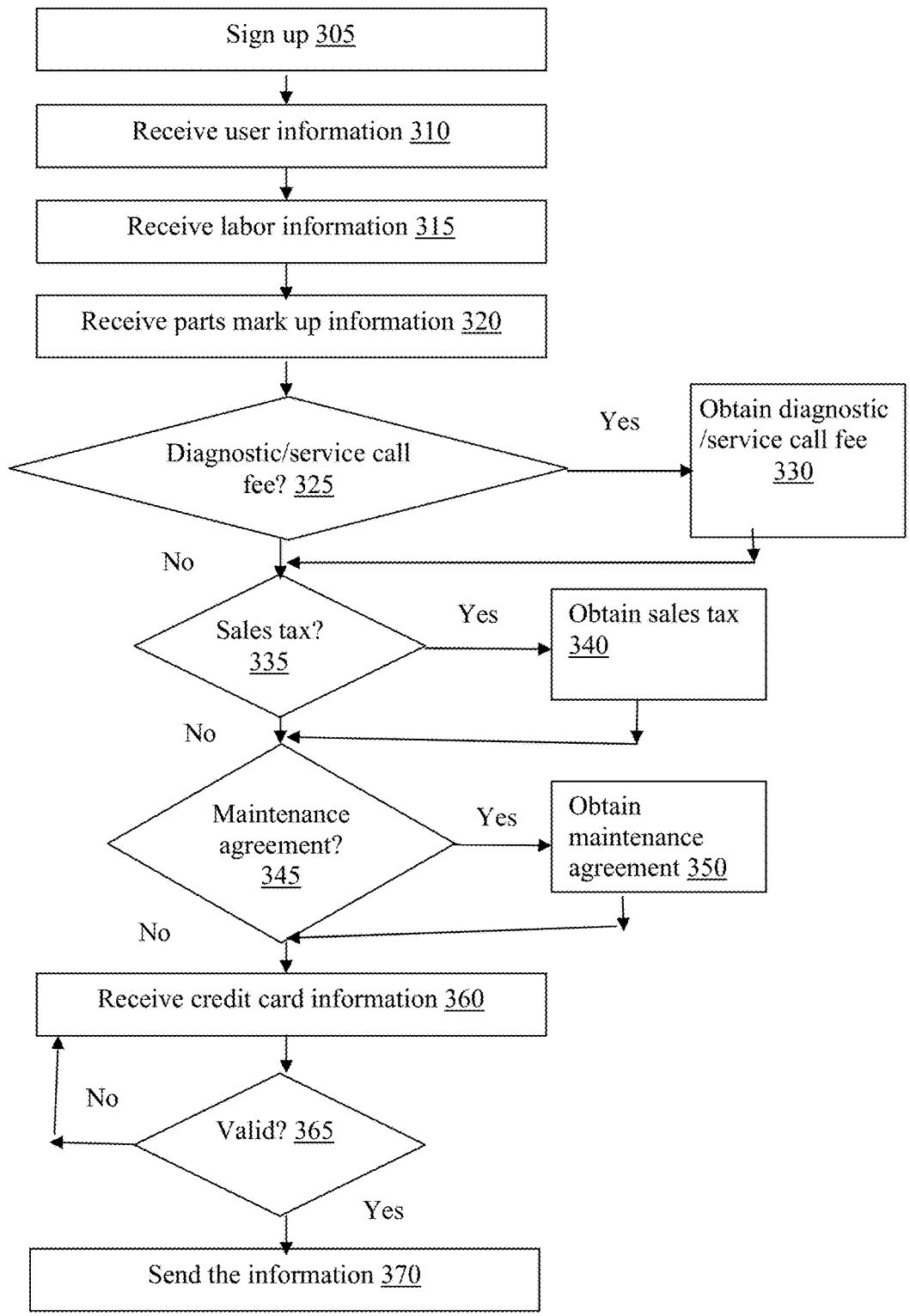
FIG. 3 is an exemplary flowchart illustrating the mobile computing device receiving user information.

Memory 20 may comprise one or more tangible storage media, such as RAM, ROM, flash memory, CD-ROM, floppy disk, hard disk drive(s), solid state memory, DVD, or other memory storage types or devices, including combinations thereof, which are known to those of ordinary skill in the art. Memory 20 may store one or more non-transitory computer-readable instructions of this technology as illustrated and described with reference to the examples herein that may be executed by the one or more processor(s) 18. The flow chart shown in FIGS. 2A-2B is representative of example steps or actions of this technology that may be embodied or expressed as one or more non-transitory computer or machine readable instructions stored in memory 20 that may be executed by the processor(s) 18.

Input device 22A enables a user, such as a contractor, to interact with the mobile computing device 14, such as to input and/or view data and/or to configure, program and/or operate it. By way of example only, input device 22A may include one or more of a touch screen, keyboard and/or a computer mouse.

The display device 22B enables a user, such as an administrator, to interact with the mobile computing device 14, such as to view and/or input information and/or to configure, program and/or operate it by way of example only. By way of example only, the display device 22B may include one or more of a CRT, LED monitor, LCD monitor, or touch screen display technology although other types and numbers of display devices could be used.

The communication interface 24 in the mobile computing device 14 is used to operatively couple and communicate between the mobile computing device 14, the servers 16 data server 17, Re-order parts electronically (ROPE) database 40, distributor devices 42, although other types and numbers of systems, devices, components, elements and/or networks with other types and numbers of connections and configurations can be used. By way of example only, the mobile computing device 14 can interact with other devices via a communication network 30 such as Local Area Network (LAN), analog radio signals, digital radio signals and Wide Area Network (WAN) and can use TCP/IP over Ethernet and industry-standard protocols, including NFS, CIFS, SOAP, XML, LDAP, and SNMP, although other types and numbers of communication networks, can be used. In this example, the bus 26 is a hyper-transport bus, although other types of buses and/or other links may be used, such as PCI.

Each of the servers 16 and the data server 17 includes a central processing unit (CPU) or processor, a memory, a communication interface, input device and display device, which are coupled together by a bus or other link, although each could have other types and numbers of elements and/or other types and numbers of network devices could be used in this environment. In this example, the servers 16 may run applications which assist the servers 16 to respond to requests from the mobile computing device 14, although the server may run other types or amounts of applications. Additionally, in this example, the mobile computing device 14 can use data server 17 to send a notification to replenish parts to the re-order parts electronically (ROPE) database 40. In another example, the servers 16 can also be configured to include the contents of the data server 17.

As illustrated in FIG. 1, environment 10 also includes a ROPE database 40 which includes information associated with parts required for repairs, although the ROPE database can include other types or amounts of information. In this example, the data server 17 interacts with the ROPE database 40 via the communication network 30, although the data server 17 can interact with the ROPE database 40 via other topologies. Additionally, the distributor devices 42 can upload data associated with the parts to the ROPE database 40 via the communication network 30, although the distributor and the ROPE database 40 can interact through other network topologies.

Each of the distributor devices 42 includes a central processing unit (CPU) or processor, a memory, a communication interface, input device and display device, which are coupled together by a bus or other link, although each could have other types and numbers of elements and/or other types and numbers of network devices could be used in this environment. In this example, the distributor devices 42 may run applications which with uploading parts data to the ROPE database 40 to respond to requests from the data server 17 or the mobile computing device 14, although the server may run other types or amounts of applications.

It is to be understood that the methods of the examples described herein are for exemplary purposes, as many variations of the specific hardware and software used to implement the examples are possible, as will be appreciated by those skilled in the relevant art(s).

Furthermore, each of the methods of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

The examples may also be embodied as the non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

Exemplary methods for generating work-order in real-time will now be described below with reference to FIGS. 1-11, which illustrate the generation of finalized a work order for the repair or installation services of a contractor, by way of example only, an electrician, a plumber, or a heating and cooling technician.

Particularly with reference to FIG. 2A, an exemplary process begins at step 205 with a mobile computing device 14 sending out a request to connect to a server 16 including multiple databases via the communication network 30, although the mobile computing device 14 can connect to the server 16 using any other methods or techniques. In this example, the multiple databases within the server 16 include repair options, although the databases can include any other information or items.

In step 210, the mobile computing device 14 once connected to server 16 sends out registration information and profile settings to the server 16. An exemplary process of the mobile computing device 14 receiving registration information from a user of the mobile computing device 14 will now be explained with reference to FIG. 3. In step 305, the user of the mobile computing device 14 signs up for an account and use of an application within the mobile computing device 14 using a web-browser, although the user of the mobile computing device 14 can alternatively sign up directly from the previously downloaded application executing with the mobile computing device 14. By way of example only, the user of the mobile computing device 14 may enter user name and password using the input device 22A as the process of signing up, although the user of the mobile computing device 14 may enter other types or amounts of information such as user location information or other demographic details. In step 310, the mobile computing device 14 receives user information associated with the user of the mobile computing device 14 such as name, company name, location, although the mobile computing device 14 can receive other types or amounts of information associated with the user of the mobile computing device 14. Next, in step 315 after successful registration, the mobile computing device 14 receives labor rates such as day rates, off-hour rates or other rates from the user of the mobile computing device 14 via the input device 22A. In step 320, the mobile computing device 14 receives a parts mark up via the input device 22A. Next in step 325, the mobile computing device 14 determines if there is a requirement for a service call diagnostic fee based on information received in step 305 and 310, although the mobile computing device 14 can determine the requirement for the service call diagnostic fee using other techniques such as by displaying a message on the display device 22B and receiving a response from the user using the input device 22A. If the mobile computing device 14 determines that a diagnostic fee is required, a Yes branch is taken to step 330 where the mobile computing device 14 receives the service call diagnostic fee from the user of the mobile computing device 14 via the input device 22A. However, if the mobile computing device 14 determines that the diagnostic fee is not required, a No branch is taken to step 335. In step 335, the mobile computing device 14 determines a requirement of sales tax information based on the geographical location of the user of the mobile computing device 14, although the mobile computing device 14 can determine the requirement of sales tax based on other parameters. If the mobile computing device 14 determines that sales tax information is required, a Yes branch is taken to step 340 where the mobile computing device 14 receives the sales tax information from the user of the mobile computing device 14 via the input device 22A, although the mobile computing device 14 can automatically obtain the sales tax information from a database (not shown) without requiring the user of the mobile computing device 14 to enter the information. However, if the mobile computing device 14 determines that there is no requirement for sales tax information, a No branch is taken to step 345. In step 345, the mobile computing device 14 determines if there is a requirement for maintenance agreement. If the mobile computing device 14 determines that there is a requirement for maintenance agreement, a Yes branch is taken to step 350 where the mobile computing device 14 receives the maintenance agreement information from the user of the mobile computing device 14 via the input device 22A, although the mobile computing device 14 can receive the maintenance agreement information from a database without having the user of the mobile computing device 14 to enter the information. However, if the mobile computing device determines that there is no requirement for having a maintenance agreement, a No branch is taken to step 360. In step 360, the mobile computing device 14 receives credit card information such as card type, card number, expiry date, full name on the card and the CVV of the credit card of the user of the mobile computing device 14 via the input device 22A. Next, in step 365, the mobile computing device 14 determines if the received credit card information is valid by matching the received information against the information stored in a credit card database (not shown), although the mobile computing device 14 can determine the validity of the credit card using other techniques. If the mobile computing device 14 determines that the received credit card information is not valid, a No branch is taken back to step 360 where the mobile computing device 14 may request the user to reenter the credit card information until completing a successful validation. However, if the mobile computing device 14 determines that the credit card is valid, a Yes branch is taken to step 370 where the mobile computing device 14 sends the registration information, diagnostic fees, sales tax fees, maintenance agreements, and the credit card information to one of the server 16 confirming successful registration.

Additionally in this example, the mobile computing device 14 can generate and apply a tag (custom label) to the registration information and the profile settings so that this information can be associated with a particular user of the mobile computing device 14. Tags can be applied to individual users or collectively to large groups of users (i.e., all technicians employed by a particular contractor, or all technicians approved to use a particular parts distributor). An individual user account may have multiple tags associated with his/her mobile computing device 14.

These tags applied by the mobile computing device 14 can be later used by the mobile computing device 14 for one or more of applying discounts (including manufacturer rebates passed along to customers, discounts applied to certain types of work), displaying or providing notifications to the user of the mobile computing device 14, not requiring the user to enter credit card information for the second time (or at all, if the user is associated with a vendor whose contract does not require it), and associating technicians with preferred parts distributors. The tags can be used for other purposes. Use of these tags by the mobile computing device 14 can assist a user in quickly and effectively generating the finalized work-order in real time.

As previously illustrated, tagging could be used for the purpose of identification. By way of example only, if the user of the mobile computing device 14 is a first time user, the mobile computing device 14 can apply a first time user tag to obtain a certain number of work-orders without payment (which can be applied to a work-order balance associated with the user's account). In this instance, the first time user tag can optionally be used to exclude the fee adjustment (cost recovery) process, as described hereinafter, for all "free" work-orders credited to the user's account.

In another example, the one or more configurations within the mobile computing device 14 could be automatically reconfigured by the mobile computing device 14 based on the applied tag. For instance, for all technicians associated with a particular contractor, the contractor may have a pre-authorized charge for work-orders on a periodic basis (e.g., daily, weekly, etc.) that allows those technicians to open new work-orders without regard to maintaining a positive work-order balance (discussed in greater detail below). By changing the one or more configurations, this technology provides advantages of the mobile computing device 14 having a customized configuration for a particular user of the mobile computing device 14.

With respect to FIG. 2A, in step 215, as a response to sending the registration information and profile settings, the mobile computing device 14 receives an activation code from the server 16 confirming the registration, although the mobile computing device and the server can confirm the registration using any other methods or techniques.

Next in step 220, the mobile computing device 14 obtains one of the databases including items for repairs from the server 16, although the mobile computing device can download any other database from the server including any amount of information in any format. In this example, the mobile computing device 14 displays a progress indicator on the display device 22B indicating the percentage of progress of obtaining one of the database including items for repairs from the server 16. However, in this example, if the connection between the mobile computing device 14 and the server 16 terminates before downloading all the data, the mobile computing device 14 restarts the process of obtaining the remaining data files and after all the data files have been processed, the mobile computing device 14 saves a success flag (to prevent reties), wherein the mobile computing device 14 automatically updates the database and continues to the next step of the exemplary process.

Figure 4:
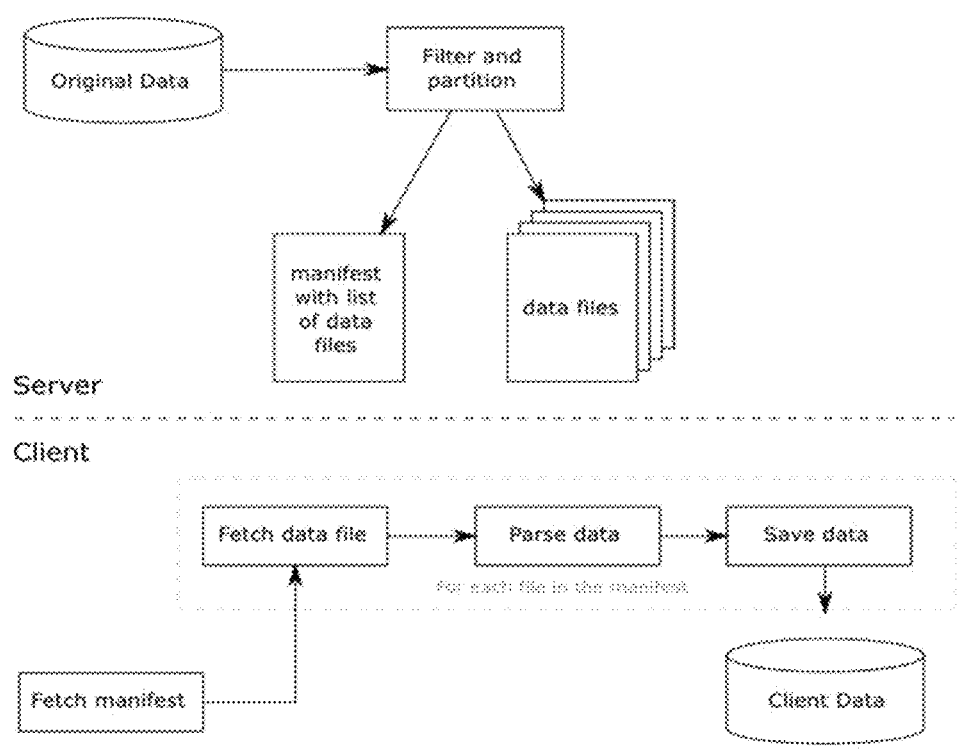
FIG. 4 is an exemplary block diagram illustrating the mobile computing device obtaining database from a server.

Additionally in this example, as further illustrated in FIG. 4, in this example, the mobile computing device 14 receives the one of the database from the server 16 with data which is split (the server splits the data), although the mobile computing device 14 can receive the database in any other format. The mobile computing device 14 adds each file to a manifest file along with any supporting metadata. Further in this example, the mobile computing device 14 further encodes the split data files and the manifest file as JSON documents to take advantage of the performance of the native parsing built into a web browser. This method of encoding of the data provides advantages of preventing a web browser from crashing as large files can lead to exhausting the memory thereby leading to failure of the web browser. Additionally, this technique of encoding optimizes the size of the data files to be as large as possible without overwhelming the capabilities of the weaker mobile computing device 14. Further, the mobile computing device 14 loads and parses the manifest file and the data files to a queue present within the memory 20 of the mobile computing device 14 and any old data on the mobile computing device 14 is deleted, although the mobile computing device 14 can store the old data at any memory location. The mobile computing device 14 persist the data in the queue by wrapping a series of SQL INSERTS in a single transaction.

It should also be appreciated that database synchronization can be carried out either automatically (e.g., daily at prescribed time), periodically at the discretion of a user (i.e., forced synchronization), or both. Synchronization allows the mobile computing device 14 to utilize the most up-to-date data concerning parts pricing and/or labor times associated with the repairs.

Having obtained the databases, the mobile computing device 14 can be used to create a new work-order, populate the work-order with fees for service or parts, and generate a finalized work-order as described herein. In one approach, a user may authorize, via the mobile computing device 14, each work-order transaction individually by paying for each work-order as it is opened. Alternatively, a user may establish with his/her account a pre-paid work-order balance that allows automated replenishment of the work-order balance if the balance equals (or falls below) a threshold level set by the user. This will allow the user to avoid having to individually authorize payment each time a work-order is opened.

Figure 10:
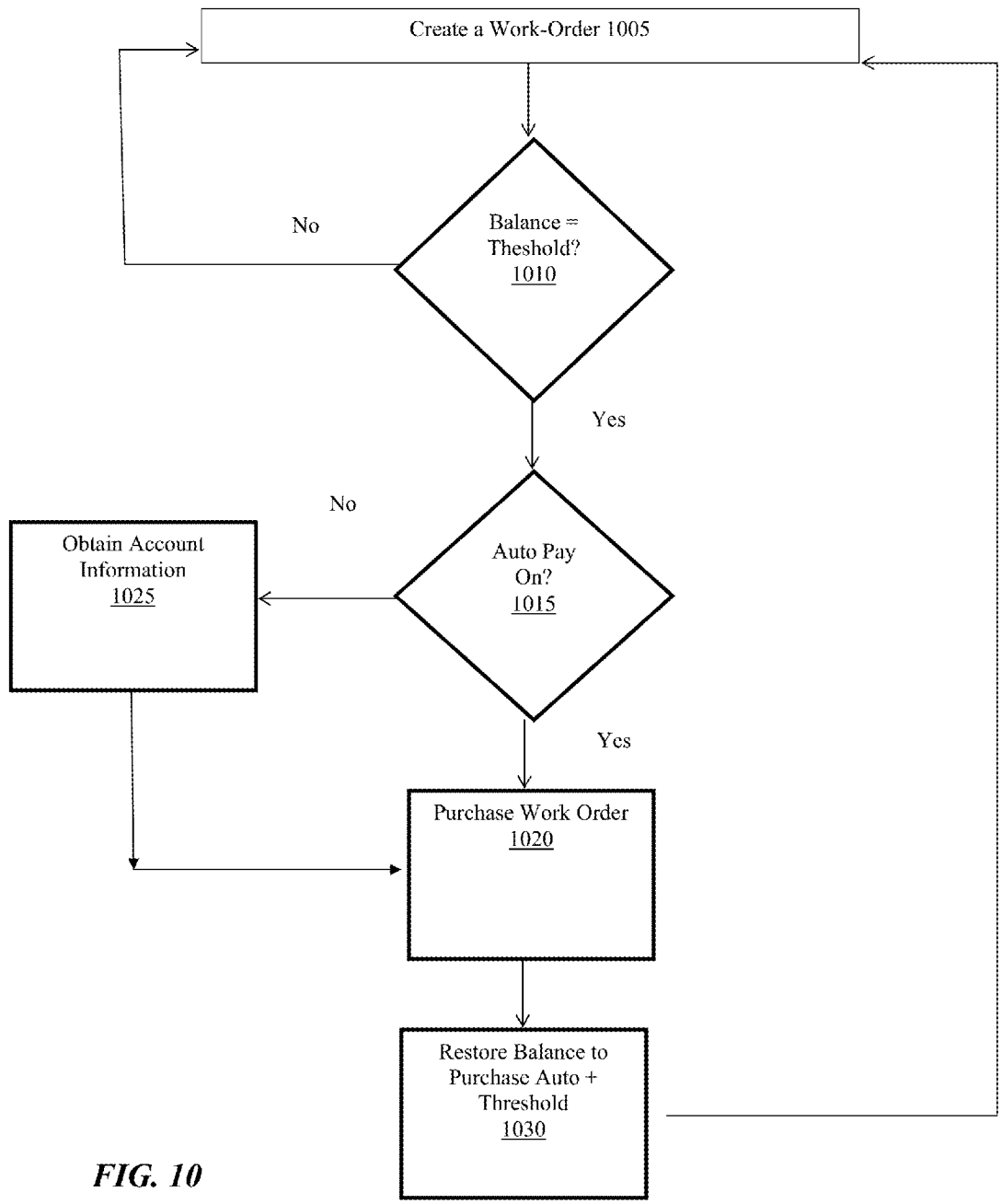
FIG. 10 is an exemplary flowchart for a method of auto-payment for a user's maintenance of a positive work-order balance.

An exemplary method will be further explained with reference to FIG. 10. In step 1005, the mobile computing device 14 creates a new work-order and also decrements a work-order balance. Next in step 1010, the mobile computing device 14 determines if the work-order balance is equal to a threshold number. The threshold number can be set arbitrarily as 0, 1, 2, 3, or any other positive integer, as desired by the user. If the mobile computing device 14 determines that the work-order balance is equal to the threshold number, a No branch is taken back to step 1005, where additional work-orders can be opened (and finalized work-orders can be generated, as further illustrated below in step 235 of FIG. 2A). However, if the mobile computing device 14 determines that the work-order balance is equal to the threshold number, then a Yes branch is taken to step 1015. In step 1015, the mobile computing device 14 determines if the current account has been registered to automatically pay for an additional amount of work-orders. If the mobile computing device 14 determines that the current account has been registered to automatically pay, a Yes branch is taken to step 1020 where a pre-defined number of work-orders are purchased and then credited at step 1030 to the work-order balance associated with the user's account. However, if the mobile computing device 14 determines that the current account has not been registered to automatically pay, a No branch is taken to step 1025. In step 1025, the mobile computing device 14 obtains account information, or credit/debit card information from the user which could be used to purchase the work-order. Once the work-order(s) have been purchased, in step 1030, the mobile computing device 14 credits the work-order balance associated with the user's account.

After opening a new work-order, having already obtaining the database from the server 16, in step 225, the mobile computing device 14 identifies items in the database. In this example, items relate to possible repair items, including repair services and parts although items can include any amount of any other information in any format. Additionally, in this example, the mobile computing device 14 identifies the items in the database by searching in the obtained database. The mobile computing device 14 searches the database by receiving one or more search terms via the input device 22A, although the mobile computing device can receive the search terms using any other methods or techniques.

Figure 5A:
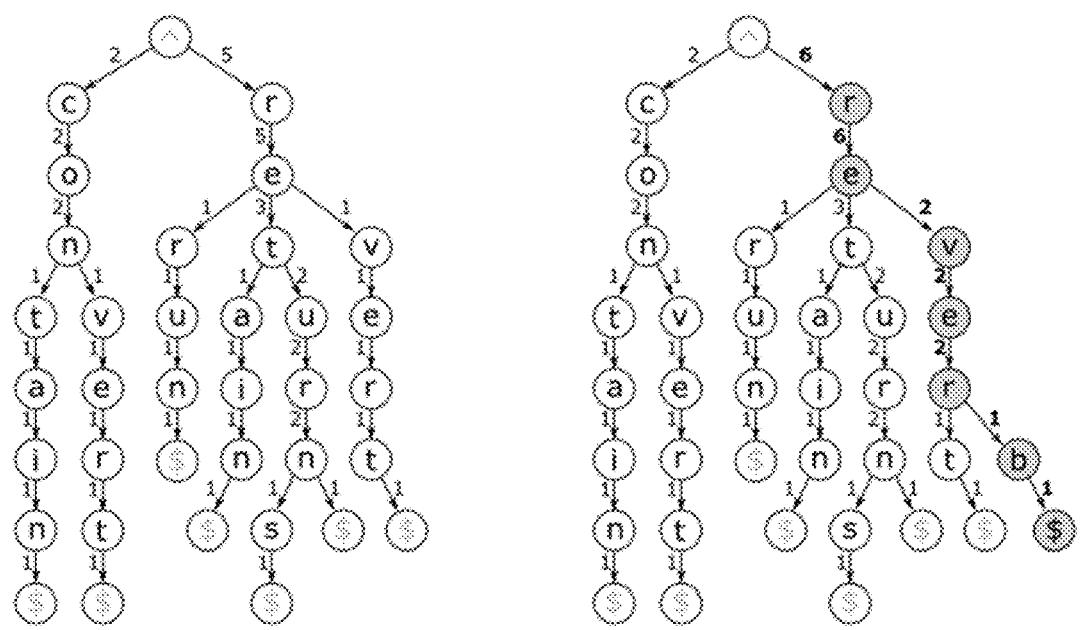
FIGS. 5A-5D is an exemplary flowchart illustrating the mobile computing device suggesting search items.

Using a list of common phrases the server 16 constructs a weighted suffix trie, which is later obtained by the mobile computing device 14 to provide suggestions to complete the search terms. In another example, the methods or functions performed by the server 16 could also be performed by the mobile computing device 14. Alternatively, server 16 can also be a part of the mobile computing device 14. An exemplary method of the server 16 constructing the weighted suffix trie will now be described. To add a phrase, the server 16 starts at the root node of the trie, and checks to see if any of the child nodes match the first letter of the phrase. If there is a match, the server 16 increases the weight of the path to that child node by one, and that child node becomes the new current node—and will be searched for the next letter in the received phrase. If the letter is not found, a new child node is added with a starting weight of one. This cycle repeats until all the letters in the phrase have been added by the server 16, and then a final node is added with a stop character ($) to indicate the end of the word (FIG. 5A). In this example, a weighted suffix trie is an ideal data structure for the index. It reduces storage and memory requirements because words with common prefixes share nodes. Also the trie structure is very efficient for quickly exploring alternative words and spellings. By adding weights to the data, the most likely suffixes for partial search terms can be found.

Figure 5B:
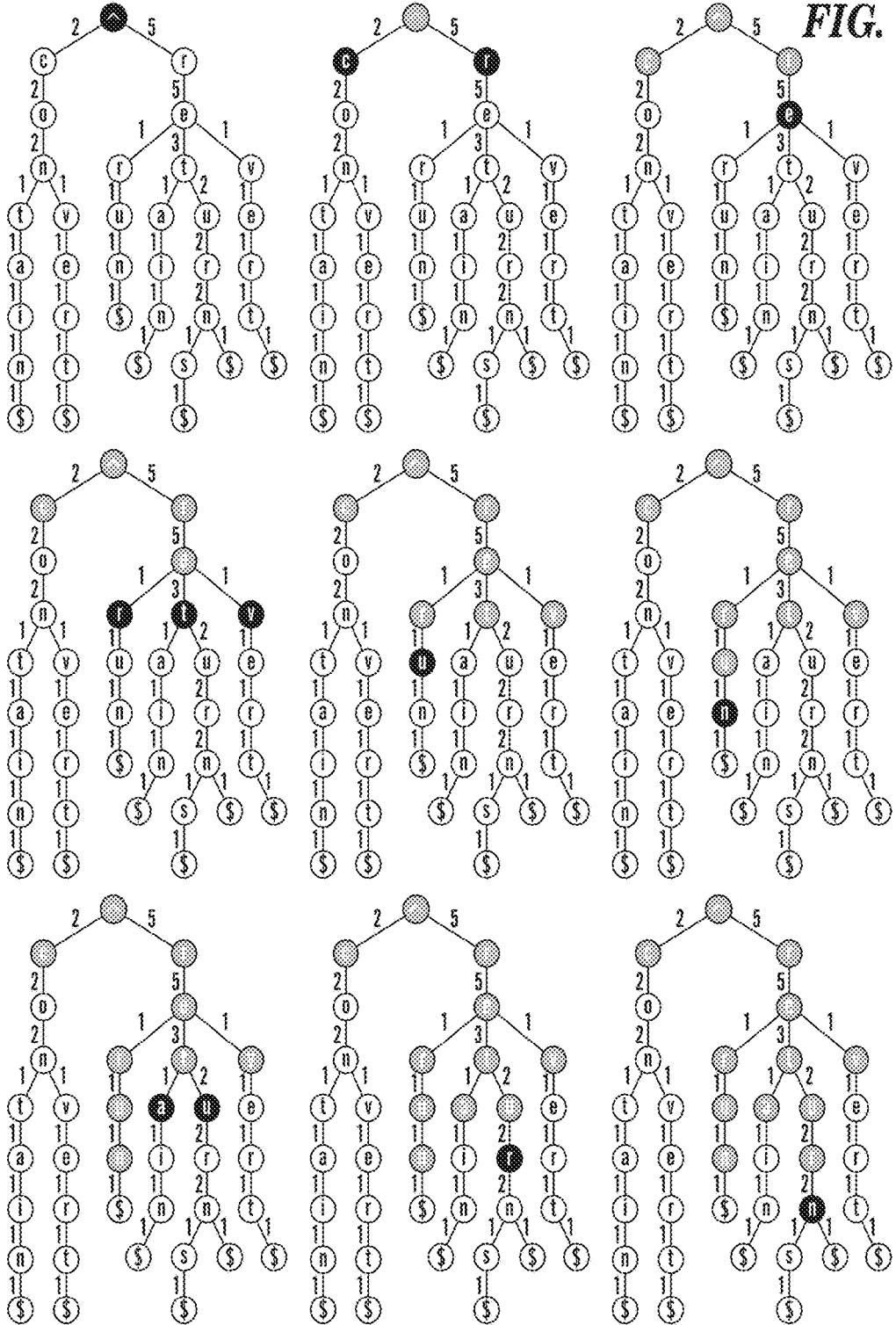
Figure 5C:
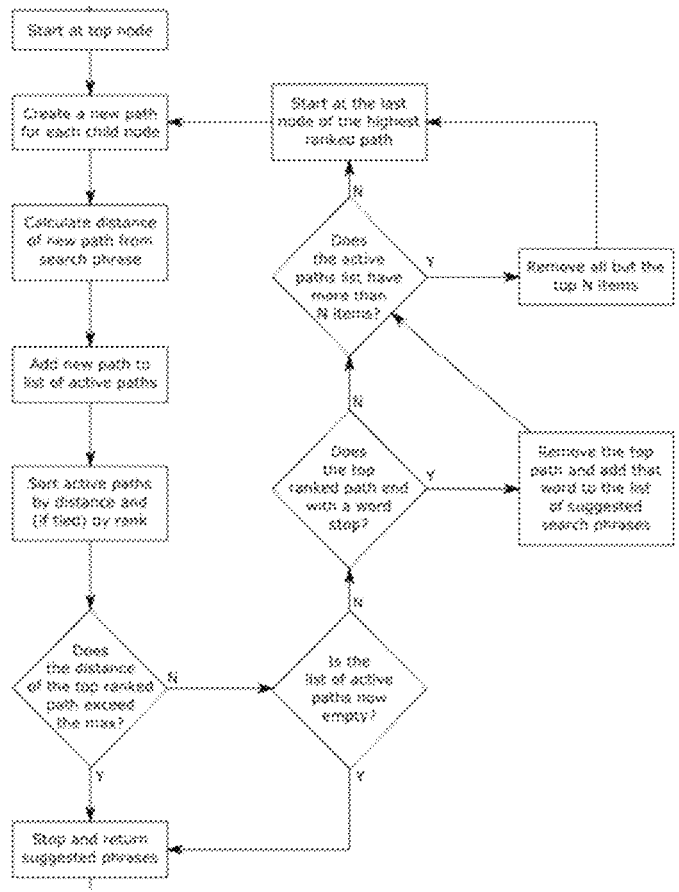
Figure 5D:
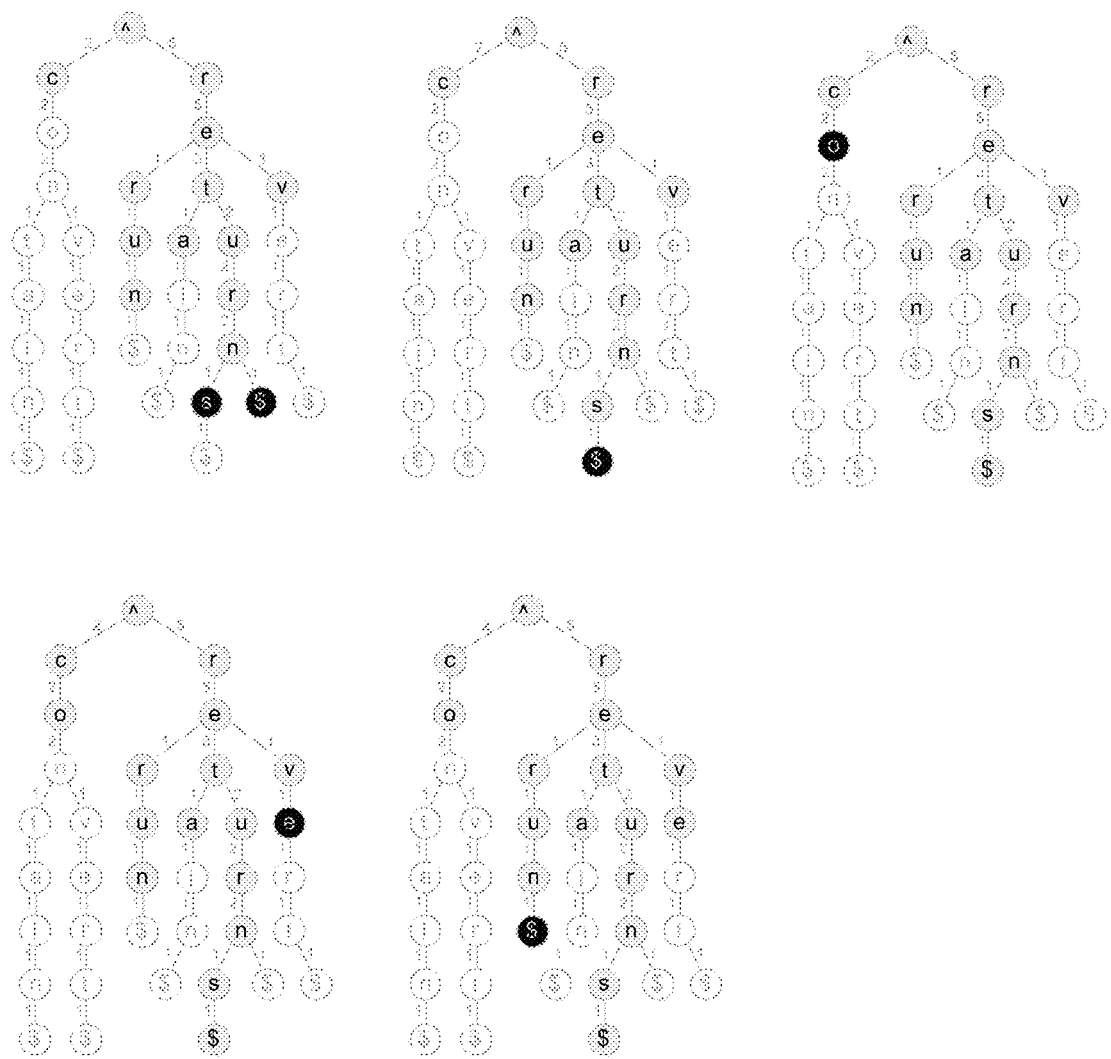

An exemplary operation will now be described considering an example as illustrated in FIGS. 5B-5D. A search for the closest matches for "rerur" will result in the following:

The search starts at the root node, and creates a path for the child nodes: "r" and "c" (FIG. 5B). The first has a distance of zero, because it is an exact match to the first "r" in "rerur". The "c" has a distance of two because it is not a match. The list of paths (sorted by distance) looks this:

| Phrase | Distance |
|--------|----------|
| R      | 0        |
| C      | 2        |

Since the "r" path is the closest, the children will be followed. The distance is still zero because the "e" is an exact match.

| Phrase | Distance |
|--------|----------|
| Re     | 0        |
| C      | 2        |

The closest path "re" is followed, and a path is added for each of its children. In this example, "rev" scores lower than "c" because the distance is the same and "c" has a higher weight in the tree. Also in this example, "ret" got a distance of one. Usually a wrong letter increases the distance by two. However, in this example the algorithm detected that proximity of the "t" and "r" (from "rerur") on the keyboard, and gave it a lower distance penalty.

| Phrase | Distance |
|---|---|
| Rer | 0 |
| Ret | 1 |
| C | 2 |
| Rev | 2 |

The "rer" path is followed, and it is still an exact match for the search phrase.

| Phrase | Distance |
|---|---|
| Reru | 0 |
| Ret | 1 |
| C | 2 |
| Rev | 2 |

Once again, the top phrase is followed but this time, when expanded to "rerun", it is no longer an exact match and falls to the bottom of the list.

| Phrase | Distance |
|---|---|
| Ret | 1 |
| C | 2 |
| Rev | 2 |
| rerun | 2 |

"ret" is followed, which adds two paths to the list "retu" and "reta". The former maintains distance because the "u" is an exact match, but the later moves away by two.

| Phrase | Distance |
|---|---|
| Retu | 1 |
| C | 2 |
| Rev | 2 |
| rerun | 2 |
| Reta | 3 |

Following "retu", produces "retur" and "return", again with no change in distance. In the next step the two children are added producing the following list.

| Phrase | Distance |
|---|---|
| return$ | 1 |
| returns | 1 |
| c | 2 |
| rev | 2 |
| rerun | 2 |
| reta | 3 |

Since "return" has hit a stop character ($), it is removed from the list of active paths and put into the first position of the results list. After the next step the same thing happens with "returns" leaving the following active paths:

| Phrase | Distance |
|---|---|
| c | 2 |
| rev | 2 |
| rerun | 2 |
| reta | 3 |

So, the search hops back over to the "c" path, which changes the phrase to "co" giving it a distance of four.

| Phrase | Distance |
|---|---|
| rev | 2 |
| rerun | 2 |
| reta | 3 |
| co | 4 |

The path for "rev" is followed to produce "reve" with a distance of four.

| Phrase | Distance |
|---|---|
| rerun | 2 |
| reta | 3 |
| co | 4 |
| reve | 4 |

Finally, "rerun" gets another chance and hits the end of word character, so it is put on the end of the results, which are now: return, returns, rerun. The above illustrated techniques will continue until: there are no more paths to search, it has collected the max number of results requested, or the distance of the closest path is outside of a "closeness" threshold. At any of these points, the current results are returned and displayed on the display device 22B by the mobile computing device 14.

The mobile computing device 14 uses selection of the provided suggestions to search for the items in the database, although the mobile computing device 14 can use any other methods or techniques to search for the items in the database. The techniques illustrated above provides advantages when the mobile computing device 14 receives search terms in a search box, suggestions are shown to: reduce the amount of typing required, show alternative spellings when the user has mistyped, and give feedback about the likelihood of a match while waiting for the full search results to load. This is especially important on the mobile computing device 14 because the search is slower, and the smaller keyboards make typing more cumbersome and errors more likely.

Next, based on the identified items, in step 230 the mobile computing device 14 determines a fee based on fee setting parameters. In this example, the mobile computing device 14 determines the fee based on an item markup percentage, sales tax and any of a variety of service rates including day rates, off-hour rates or any other associated rates previously received in step 210, although the mobile computing device 14 can determine the fee based on any other or types or parameters. The mobile computing device 14 can also use a custom setting present within the mobile computing device 14 to determine the fee. When calculating the sale price of parts, the mobile computing device 14 will multiply the cost of the part against a markup multiplier received in step 210 to determine the final sale price. This multiplier is based on the cost of the part, with less expensive parts typically having a higher multiplier. Typically these markups are described as a series of ranges, as illustrated in the table below:

| Price Range | | Markup |
|---|---|---|
| Above | Below | |
| — | $2.00 | 5 |
| $2.00 | $5.00 | 5 |
| $5.00 | $10.00 | 4 |
| $10.00 | $20.00 | 3.5 |

| Price Range | | |
|---|---|---|
| Above | Below | Markup |
| $20.00 | $40.00 | 3 |
| $40.00 | $60.00 | 2.75 |
| $60.00 | $100.00 | 2.5 |
| $100.00 | $150.00 | 2.25 |
| $150.00 | $500.00 | 2 |
| $500.00 | — | 1.3 |

Figure 11A:
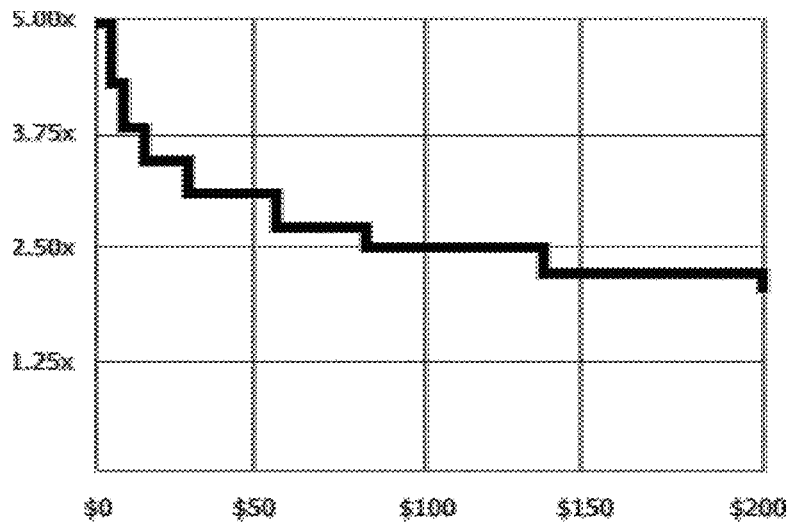
FIGS. 11A-B are graphs illustrating an exemplary parts mark-up protocol without (FIG. 11A) and with (FIG. 11B) use of an algorithm to smooth transitions between different mark-up categories.
Figure 11B:
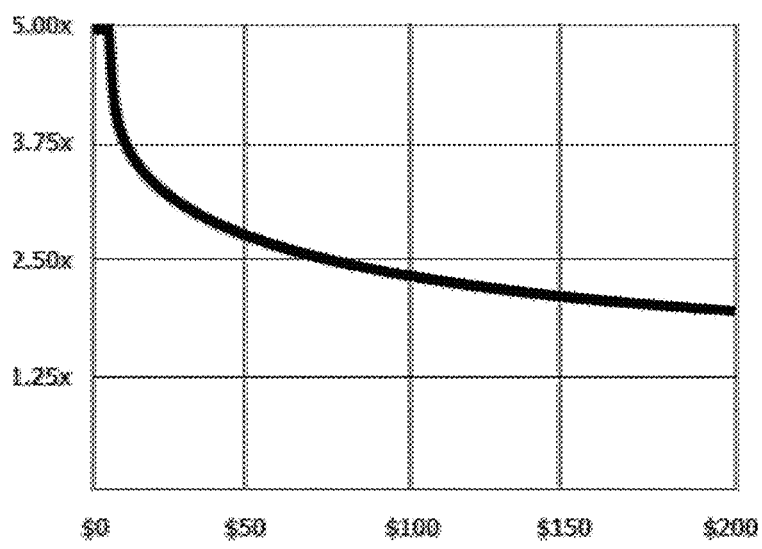

By way of example only, an $8 part would fall in the $5-10 range and the multiplier would be four, giving a final sale price of $32 ($8×4). This markup creates an unusual circumstance when crossing the boundaries between ranges (as illustrated in FIG. 11A). For example: A $4.50 part has a markup of 5×, resulting in a sale price of $22.50; but a $5.10 part, which has a markup of 4×, would have a sale price of just $20.40, making it less expensive than the $4.50 part.

Additionally, in this example, the mobile computing device 14 determines the item markup percentage using a markup range and a smoothing function which will now be described using the following equation, although the mobile computing device 14 can calculate the item markup percentage can be using any other methods or techniques:

$$I+(E-I)\times((C-L)/(H-L))^{1/S\times((C-L)/(H-L))^{1/V}}$$

wherein I is a markup for inexpensive parts, E is a markup for expensive parts, C is a cost of the part, L is a minimum part cost, H is a maximum part cost, S is a maximum smoothing and V is a curve variation and the value of C should be between L and H, as a precondition for the equation. However, when C is less than L or greater than H, then the algorithm returns the value of I or E respectively. In this example, the maximum smoothing and curve variation are defined to achieve the desired curve shape in an otherwise step-shaped markup graph shown in FIG. 11A. This allows for a more aggressive decrease in the markup as the part cost increases. However, regardless of the shape of the markup curve, as the multipliers for expensive and inexpensive parts converge, the resulting markups conveniently flatten out, turning into a flat line when the two multipliers are equal. By creating a function that can calculate a continuous markup multiplier for any part price, the choppiness can be removed (compare FIGS. 11A-B) and less costly parts will not get marked up to a higher sales price than more expensive parts.

Optionally, the fee determined by the mobile computing device 14 can be a customized fee saved in a database. For example, a user may have a discounted service fees for certain customers (i.e., volume-related discounts), and the customized fees can be accessed from the database for those customers.

Next in step 235, the mobile computing device 14 generates a work-order in real-time based on the determined fee and the selected items, although the mobile computing device can generate the work order using any other parameters. In this example, the work order includes the list of all the selected items (repair items), parts associated with the repair items and diagnostic fees, maintenance fees, the associated fee of the selected items and the total fee, although the mobile computing device can generate the work-order using any combination of fee parameters as well as other parameters. In this example, prior to finalizing the generated work order, the mobile computing device 14 performs one or more of determining a cost recovery fee adjustment, applying a discount, or determining for availability of parts required for repairs within the generated work-order, although the mobile computing device 14 may perform other operations prior to finalizing the generated the work-order in real time.

Figure 6A:
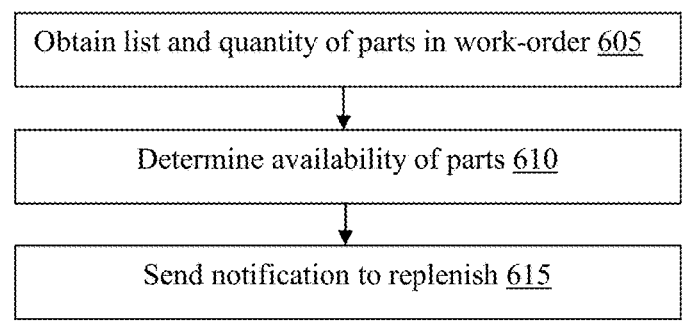
FIG. 6A-C illustrate an exemplary parts reordering system, where
Figure 6B:
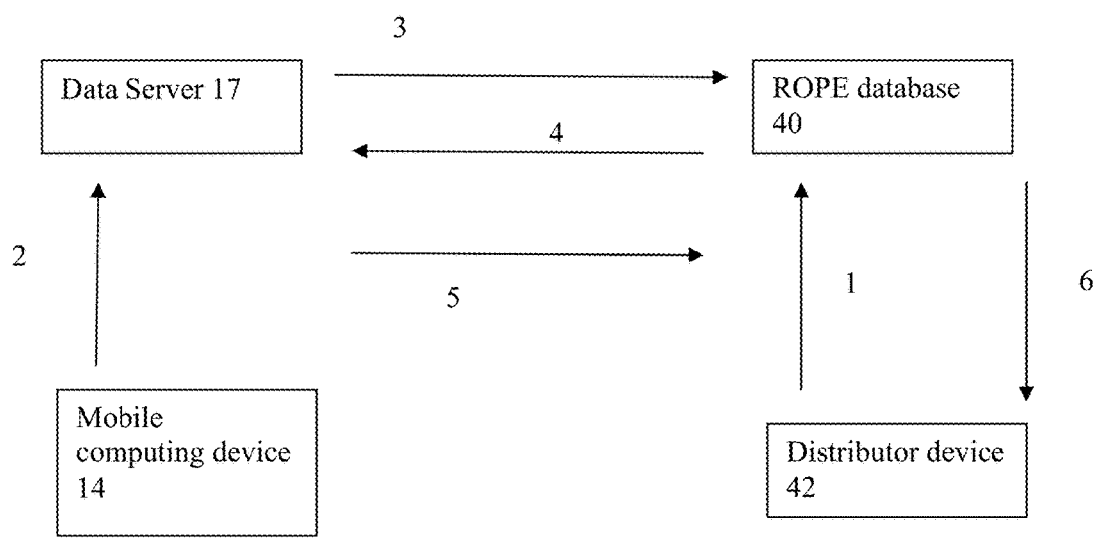

An exemplary method for determining availability of parts required for repair within the generated work-order will now be illustrated with reference to FIGS. 6A-6C. In step 605, the mobile computing device 14 obtains all the list and quantity of all the parts required for the repairs present within the generated work-order, although the mobile computing device can obtain other information from the generated work-order. Next in step 610, the mobile computing device 14 determines using a data server 17, if the obtained list of parts is available within the ROPE database 40, although the mobile computing device 14 can determine without using the data server 17. By way of example only, the mobile computing device 14 compares the list and quantity of obtained parts against a table (which includes the list and quantities of all parts present within a parts warehouse) present within the ROPE database 40 to determine the availability, although the mobile computing device 14 can determine the availability using other techniques. In step 615, based on the determination, the mobile computing device 14 using the data server 17 sends out a notification to the ROPE database 40 to replenish the required parts. Alternatively, the user of the mobile computing device 14 can manually choose to submit all parts consumed for replenishment or only a subset of those parts, export a list of the remaining parts, or augment the order with other parts using the mobile computing device 14. In yet another alternative approach, a contractor with multiple technicians may elect to aggregate consumed parts on a regular or as-needed basis, and collectively order parts as frequently as desired.

Regardless of the approach, the ROPE database 40 then forwards this notification to the distributor device to replenish the parts. This interaction is further explained with reference to FIG. 6B. In step 1, the distributor device 42 uploads the parts data to the ROPE database 40, although the distributor device 42 can upload other types or amounts of information. Next, in step 2, the mobile computing device 14 sends the list of parts required for the repair to the data server 17, although the mobile computing device 14 can send other information present in the work-order to the data server 17. In step 3, the data server 14 sends a list of manufacturer part numbers for the list of parts received from the mobile computing device 14 to the ROPE database 40. Next in step 4, the ROPE database 40 performs a search to determine further details associated with the parts back to the data server 17. In step 5, responsive to receiving the further details associated with the parts, the data server 17 sends a notification to replenish the parts to the ROPE database 40. In step 6, the ROPE database 40 forwards the notification to the distributor device 42 to replenish the parts.

Figure 6C:
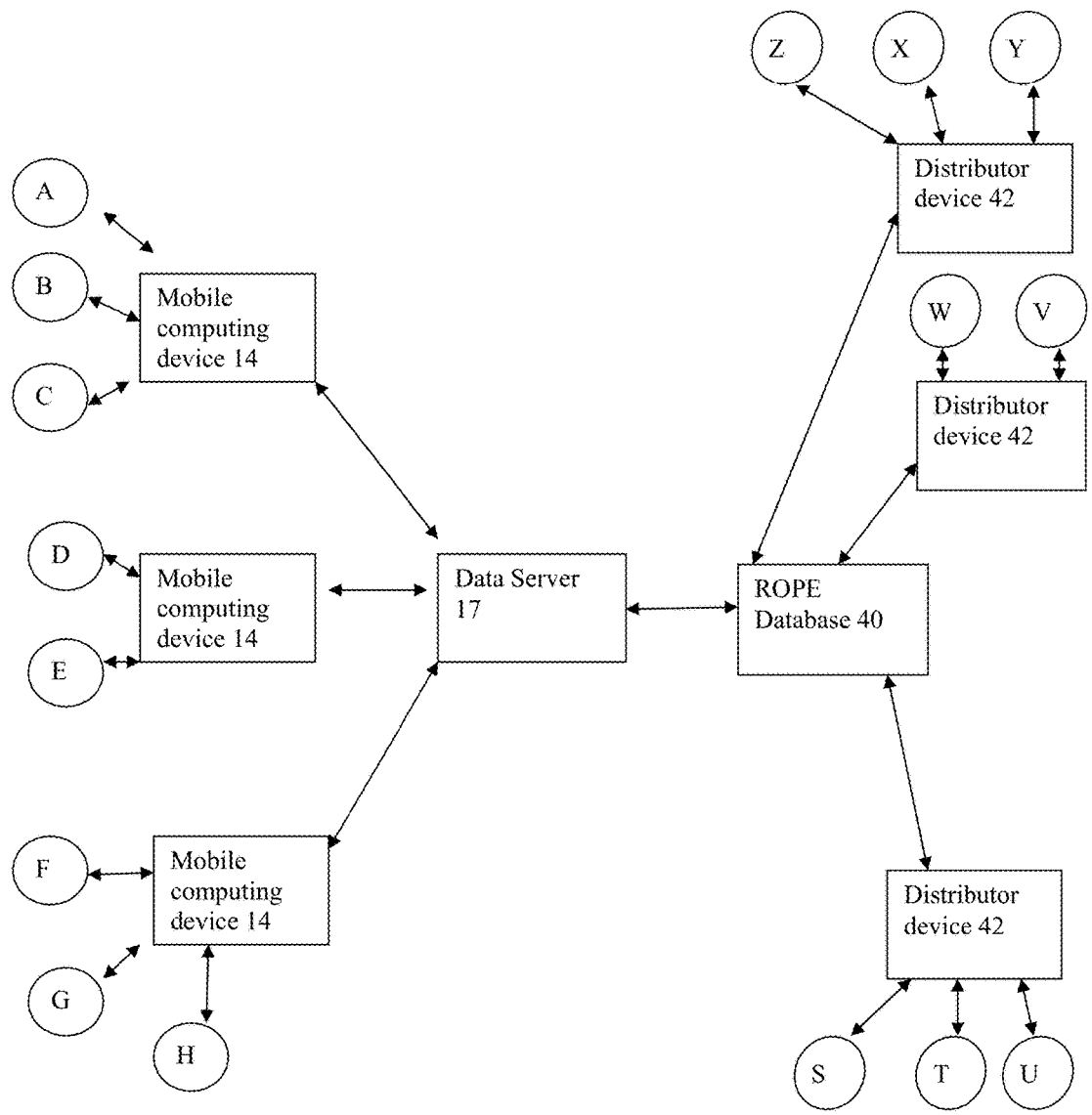

Additionally, FIG. 6C illustrates the environment of the mobile computing device 14, data server 17, ROPE database 40 and distributor device 42. In FIG. 6C, A-H are employees associated with a contractor using the mobile computing device 14 and S-Z are location associated with the distributor device 42, although the employees A-H could be associated with multiple contractors and locations S-Z could be associated with multiple distributers. These relations between the employees-contractors and locations-distributors may be established using tags previously illustrated.

As illustrated in FIG. 6C, the ROPE database establishes relationships between the mobile computing device 14 (contractors) and the distributor device 42 such that any mobile computing device 14 can order parts from any distributor device 42 for which a relationship has been established in the system. However, there is no limit to the number of mobile computing device 14 and distributor device 42 relationship and they may be established or dissolved at any time. Additionally, in this example, once a relationship between the mobile computing device 14 and the distributor device 14 has been established, a secondary relationship between the employee using the mobile computing device 14 and the distributor location may be established such that a specific employee may order from a specific distributor location.

Figure 7:
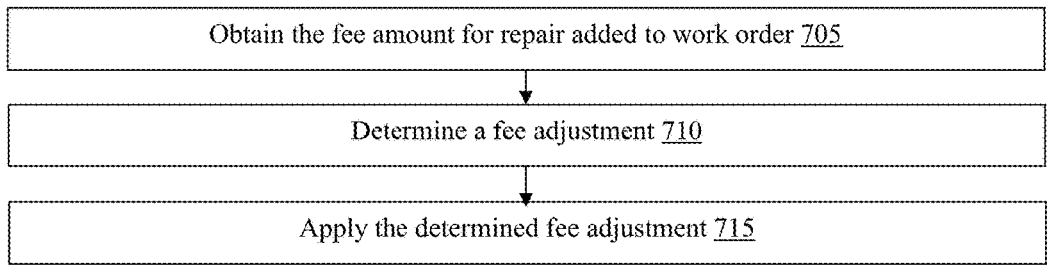
FIG. 7 is an exemplary flowchart illustrating a method for determining and applying a fee adjustment (for cost recovery)

An exemplary method for determining a cost recovery will now be illustrated with reference to FIG. 7. Effectively, the method described below allows a user to recoup a cost associated with generating a work-order from the customer receiving services from the user. In step 705, the mobile computing device 14 obtains the fee associated with each repair of the work-order, although the mobile computing device 14 can also obtain the aggregate fee for all repairs in the work order. Next in step 710, the mobile computing device 14 determines a fee adjustment value for the obtained repair fee. By way of example only, the mobile computing device 14 can determine the fee adjustment value based on a pre-defined fee adjustment value (cost recovery value) stored within the database (not shown), although the mobile computing device 14 can determine the fee adjustment value based on other parameters. This fee adjustment value can be applied once per work-order or, in the instance of complicated work-orders containing many repairs, the fee adjustment value can be applied more than once per work-order, if desired. For example, the fee adjustment value can be applied to the first repair and every other repair, or third or fourth repair, thereafter. Alternatively, in another example, the mobile computing device 14 can determine a fee adjustment value for the total sum of all repairs within the generated work-order based on the pre-defined fee adjustment value. Regardless of the approach used, in step 715 the mobile computing device 14 applies the determined fee adjustment value to the repair fee(s) in the generated work-order.

Figure 8A:
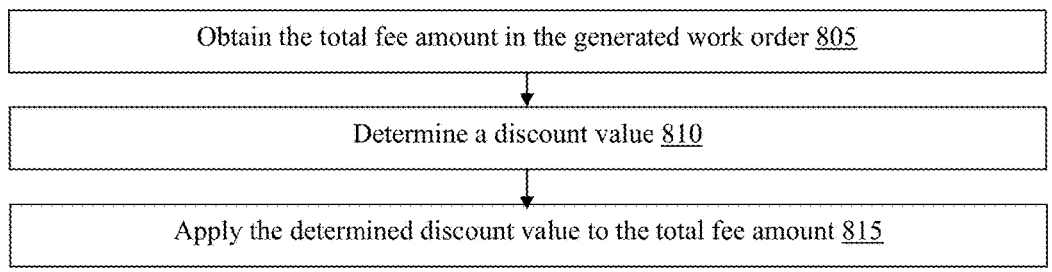
FIGS. 8A-B are exemplary flowcharts illustrating a method for determining a discount value to be applied to a work order as a whole (FIG. 8A) or per selected repair (FIG. 8B)

An exemplary method for applying discounts will now be illustrated with reference to FIG. 8A. In step 805, the mobile computing device 14 obtains the total fee present within the generated work-order. In step 810, the mobile computing device 14 determines a discount value (which can be a promotional code, or a coupon value) to be applied to the obtained total fee. In this example, the mobile computing device 14 can determine the discount value based one or more of the tags applied to the user account, a coupon code or a promotional code received from a user via the input device 22A, a pre-defined discount value based on the total fee in the invoice, or a pre-defined discount value based on the total number of repairs within the invoice, although the mobile computing device 14 can determined the discount value based on other parameters (e.g., discount associated with a maintenance agreement or manufacturer rebate passed along to customer). Next, in step 815, the mobile computing device 14 applies the determined discount value to the total fee in the generated work-order.

Figure 8B:
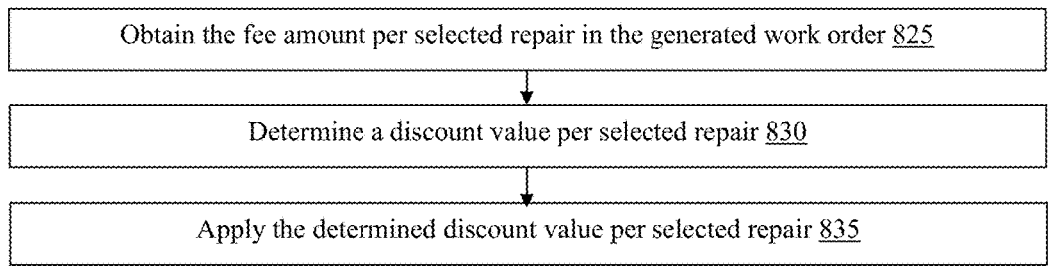

In another exemplary method, illustrated in FIG. 8B, the mobile computing device 14 can obtain fees associated with one or more selected repairs within the generated work-order, and apply any discount selectively to the one or more repairs. For example, in step 825, the mobile computing device 14 obtains the fee amount per selected repair in the generated work order. In step 830, the mobile computing device 14 determines a discount value (which can be a promotional code, or a coupon value, as described above) to be applied to the obtained fee, which has been selected by a user. Next, in step 835, the mobile computing device 14 applies the determined discount value to the selected repair fee in the generated work-order, and the total sum of all repair fees can be generated for the whole work-order.

Figure 9:
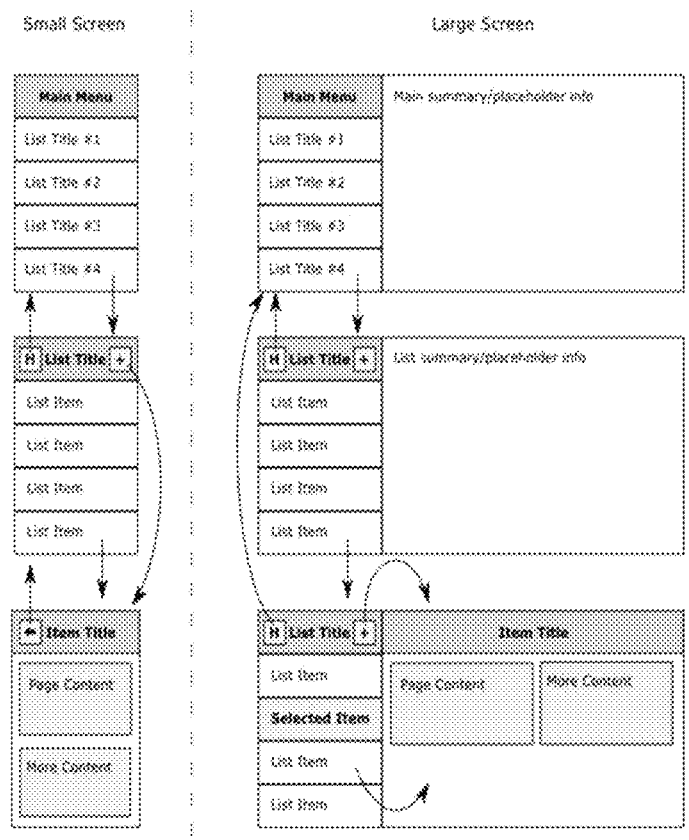
FIG. 9 is an exemplary block diagram illustrating the mobile computing device displaying a work-order.

Now with reference to FIG. 2A, in step 240 the mobile computing device 14 provides the generated work-order to fit within the display device 22B using techniques which will now be illustrated, although the mobile computing device 14 can provide the generated work-order using any other methods or techniques. The mobile computing device 14 divides the display device 22B into two types of pages a navigation page and a content page. When on a navigation page, the mobile computing device 14 displays a list of items. Upon receiving a selection of the listed items, the mobile computing device 14 loads another navigation page or a content page. Additionally, if the display device 22B of the mobile computing device 14 is wide enough, the navigation page will show a summary/placeholder page to the right of the navigation pane as illustrated in FIG. 9.

However, on a content page, the navigation will not be shown—unless the browser is wide enough to accommodate both navigation and content—and a "back" button will be provided by the mobile computing device 14. The back button provided by the mobile computing device 14 would assist with moving back to the previous navigation page. This illustrated technique, provides advantages of changing the user interface on the display device to adjust based on the width of the browser viewport, which is independent of the mobile computing device 14. Additionally, the illustrated technique can adjust the presence of the navigation in response to resizing of the browser window and orientation changes of mobile computing devices. Furthermore, the illustrated technique can be implemented on any device and the technique does not rely on detecting device's make or model.

In step 245, the mobile computing device 14 determines if any changes are necessary to the provided work-order based on inputs received at the input device 22A of the mobile computing device, although the mobile computing device can determine necessary changes using any other methods or techniques. In this example, the mobile computing device 14 can receive any necessary changes or confirmation via the input device 22A to the provided generated work-order. If the mobile computing device 14 determines any changes are needed for the provided work-order, a Yes branch is taken to step 250 to obtain the changes to the work order and then to generate a revised work-order.

However, if the mobile computing device 14 determines that no further changes are required, a No branch is taken to step 255 where the invoice for the work order is generated by the mobile computing device 14 based on the total fee present within the generated work-order. In this example, the mobile computing device 14 can receive a signature on the work-order via the input device 22A confirming the details of the work-order.

In step 260, the mobile computing device 14 determines if a fee set forth in the invoice has been paid. If the mobile computing device 14 determines that the fee in the invoice has been paid, a Yes branch is taken to step 270 to update the generated invoice and the work-order in the database. However, if the mobile computing device 14 determines that the fee set forth in claim invoice has not been paid, a No branch is taken to step 265 where the mobile computing device 14 can either wait until the fee has been paid and then proceed to update the work-order and invoice. Alternatively, the mobile computing device 14 can wait until a certain period of time, by way of example only 30 days, after which the mobile computing device 14 can automatically update the work-order and the invoice to the database and store or archive the work-order and the invoice.

In step 270, while updating the work-order and the invoice to the database in the server, the mobile computing device 14 first checks whether there is a network connection between the mobile computing device 14 and the server 16. If the mobile computing device determines that there is a network connection (online) between the mobile computing device 14 and the server 16, a Yes branch is taken to step 280 where the mobile computing device 14 directly uploads or stores the work-order and the invoice to the databases present in the server 16, although the mobile computing device 14 can save the work-order locally within the memory 20 and then uploaded to database present in the server 16. However, if the mobile computing device 14 determines that there is no connection (offline) between the mobile computing device 14 and the server 16, a No branch is taken to step 275 where the mobile computing device 14 uploads or stores the work-order in the previously obtained database from the server 16 (which is stored within the memory of the mobile computing device), and once the network connection is established between the mobile computing device 14 and the server 16, the mobile computing device 14 proceeds to update the database present in the server 16, with the one present within the memory 20 of the mobile computing device 14. Additionally, the mobile computing device 14 can automatically receives notification from the server 16 where there are any updates determined by the server 16.

In step 285, the mobile computing device 14 closes the work-order and the exemplary process ends.

Additionally, the mobile computing device 14 may provide rewards upon successful completion of work-orders and/or closing of work-orders upon receipt of payment. By way of example only, the mobile computing device 14 can add the amount present in the invoice to the account associated with the user of the mobile computing device 14, and reward the user by notifying the user of the number of completed work-orders over a period of time, the percentage of completed work-orders that are closed with payment of the invoice, the aggregate sum of invoices over a period of time, whether the user is in, e.g., the top 25% percent of technicians employed by a particular contractor, etc. The mobile computing device 14 can provide notification (triggers) via text message, email or on the display device 22B indicating the rewards supplied to the user.

Figure 12:
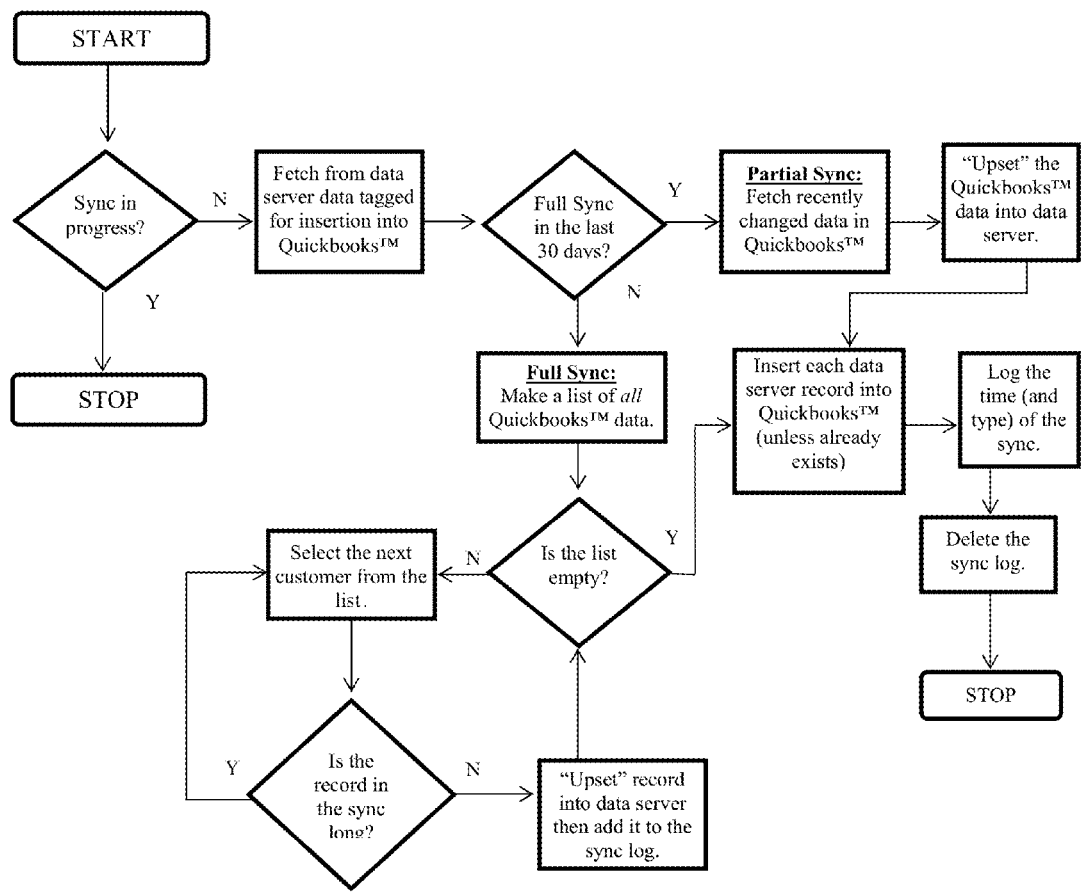
FIG. 12 is an exemplary flowchart for a method of synchronizing data from the inventive devices to a device operating accounting software such as QuickBooks™.

A further aspect of the invention includes the ability to synchronize the completed invoice data or completed but unpaid work-order data or customer data from the inventive device and method to accounting software such as QuickBooks™ and back from the accounting software such as QuickBooks™ to the inventive device. This can be achieved using tagged database records, and synchronization of the tagged records. An exemplary method for data synchronizing is illustrated in FIG. 12.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for generating a work-order in real time using one or more mobile computing devices, the method comprising:
    identifying, by one or more mobile computing devices, one or more databases comprising data in a split format from a data server through a network connection, wherein the identifying further comprises obtaining the identified one or more databases and consuming computing resources including memory and processing cycles to transmit a plurality of electronic notifications;
    reducing consumption of the computing resources to transmit the plurality of electronic notifications by:
    encoding the obtained one or more databases to a format compatible to be executed by the one or more mobile computing devices;
    stabilizing a web serving by the one or more mobile computing devices; and
    persisting the data in a queue by storing the identified one or more databases;
    identifying, by the one or more mobile computing devices, one or more items in the identified one or more databases based on a received plurality of search terms, wherein the received plurality of search terms comprises a first part received from a client device and a second part automatically completed by the one or more mobile devices based on the received first part;
    determining, by the one or more mobile computing devices, a fee for the identified one or more items based on fee setting parameters comprising a markup percentage, a cost recovery fee adjustment, a sales tax, and a service rate, wherein the determining the fee further comprises identifying a discount value for the determined fee by applying a custom label associated with a user to generate an adjusted determined fee, wherein the customer label is associated with one or more of:
    delivering, by the one or more mobile computing devices, a message to all users associated with the custom label;
    configuring, by the one or more mobile computing devices, one or more configurations within the mobile computing device for all users associated with the custom label, wherein the one or more configurations is one or more of a first configuration for one or more employees of a particular contractor, or a second configuration for custom prices;
    applying, by the one or more mobile computing devices, a discount coupon or a promotional code to all users associated with the custom label; or
    bypassing, by the one or more mobile computing devices, a user account balance threshold level requirement for all users associated with the custom label; and
    generating, by the one or more mobile computing devices, a finalized work-order in real-time based on the adjusted determined fee.

2. The method as set forth in claim 1 further comprising:
    determining, by the one or more mobile computing devices, a final invoice amount based on one or more of a determined fees, the determined fee adjustment, or the determined discount value; and generating, by the one or more mobile computing devices, an invoice associated with the generated work-order based on the determined final invoice amount.

3. The method as set forth in claim 2 further comprising:
identifying, by the one or more mobile computing devices, a reward based on one or more of the generated invoices; and
providing, by the one or more mobile computing devices, one or more reward notifications indicating the identified reward.

4. The method as set forth in claim 1 wherein, upon a user account balance falling below a threshold level, the method further comprising one or more of:
authorizing, by the one or more mobile computing devices, a payment by a user to re-establish a user account balance that exceeds the threshold level;
notifying a user, by the one or more mobile computing devices, of the user account balance;
allowing, by the one or more mobile computing devices, to generate one or more work-orders until the user account balance is zero; and
disallowing, by the one or more mobile computing devices, from generating one or more work-orders until the user account balance is above the threshold level.

5. The method as set forth in claim 1 further comprising:
determining, by the one or more mobile computing devices, occurrence of one or more event triggers, upon generating the work-order; and
providing, by the one or more mobile computing devices, one or more notifications associated with the one or more event triggers upon determining the occurrence of the one or more event triggers.

6. The method as set forth in claim 1 wherein the determining the discount value further comprises:
determining, by the one or more mobile computing devices, existence of one or more of a discount coupon, for the user or the custom label applied to the user; and
applying, by the one or more mobile computing devices, the discount value to the one or more determined fees upon determining the presence of the one or more discount coupon.

7. The method as set forth in claim 1 wherein the identifying further comprises:
determining, by the one or more mobile computing devices, a requirement of one or more parts for the identified one or more items;
determining, by the one or more mobile computing devices via a data server, an availability of the determined one or more parts in a parts data warehouse;
sending, by the one or more mobile computing devices via the data server, a notification to the parts data warehouse to replenish the one or more parts based on the determination.

8. The method as set forth in claim 7 further comprising:
ordering, by the one or more mobile computing devices, the one or more parts from a pre-established distributor; and
ordering, by the one or more mobile computing devices, the one or more parts from a different distributor for a specific employee.

9. The method as set forth in claim 1 wherein the split format is a JSON format.

10. A non-transitory computer readable medium having stored thereon instructions for generating a work-order in real time on a mobile computing device comprising machine executable code which when executed by at least one processor, causes the processor to perform steps comprising:
identifying one or more databases comprising data in a split format from a data server through a network connection, wherein the identifying further comprises obtaining the identified one or more databases and consuming computing resources including memory and processing cycles to transmit a plurality of electronic notifications;
reducing consumption of the computing resources to transmit the plurality of electronic notifications by:
encoding the obtained one or more databases to a format compatible to be executed by the one or more mobile computing devices;
stabilizing a web serving by the one or more mobile computing devices; and
persisting the data in a queue by storing the identified one or more databases;
identifying one or more items in the identified one or more databases based on a received plurality of search terms, wherein the received plurality of search terms comprises a first part received from a client device and a second part automatically completed by the one or more mobile devices based on the received first part;
determining a fee for the identified one or more items based on fee setting parameters comprising a markup percentage, a cost recovery fee adjustment, a sales tax, and a service rate, wherein the determining the fee further comprises identifying a discount value for the determined fee by applying a custom label associated with a user to generate an adjusted determined fee, wherein the customer label is associated with one or more of:
delivering a message to all users associated with the custom label;
configuring one or more configurations within the mobile computing device for all users associated with the custom label, wherein the one or more configurations is one or more of a first configuration for one or more employees of a particular contractor, or a second configuration for custom prices;
applying a discount coupon or a promotional code to all users associated with the custom label; or
bypassing a user account balance threshold level requirement for all users associated with the custom label; and
generating a finalized work-order in real-time based on the adjusted determined fee.

11. The medium as set forth in claim 10 further comprising:
determining a final invoice amount based on one or more of a determined fees, the determined fee adjustment, or the determined discount value; and
generating an invoice associated with the generated work-order based on the determined final invoice amount.

12. The medium as set forth in claim 11 further comprising:
identifying a reward based on one or more of the generated invoices; and
providing one or more reward notifications indicating the identified reward.

13. The medium as set forth in claim 10 wherein, upon a user account balance falling below a threshold level, the method further comprising one or more of:
authorizing a payment by a user to re-establish a user account balance that exceeds the threshold level;
notifying a user of the user account balance;

allowing to generate one or more work-orders until the user account balance is zero; and disallowing from generating one or more work-orders until the user account balance is above the threshold level.

14. The medium as set forth in claim 10 further comprising:

determining occurrence of one or more event triggers, upon generating the work-order; and providing one or more notifications associated with the one or more event triggers upon determining the occurrence of the one or more event triggers.

15. The medium as set forth in claim 10 wherein the determining the discount value further comprises:

determining existence of one or more of a discount coupon for the user or the custom label applied to the user; and applying the discount value to the one or more determined fees upon determining the presence of the one or more discount coupon.

16. The medium as set forth in claim 10, wherein the identifying further comprises:

determining a requirement of one or more parts for the identified one or more items;

determining, an availability of the one or more parts in a parts data warehouse;

sending a notification to the parts data warehouse to replenish the one or more parts based on the determination.

17. The medium as set forth in claim 16 further comprising:

ordering the one or more parts from a pre-established distributor; and ordering the one or more parts from a different distributor for a specific employee.

18. The medium as set forth in claim 10 wherein the split format is a JSON format.

19. A mobile computing device comprising:

one or more processors;

a memory, wherein the memory coupled to the one or more processors which are configured to execute programmed instructions stored in the memory comprising:

identifying one or more databases comprising data in a split format from a data server through a network connection, wherein the identifying further comprises obtaining the identified one or more databases and consuming computing resources including memory and processing cycles to transmit a plurality of electronic notifications;

reducing consumption of the computing resources to transmit the plurality of electronic notifications by:

encoding the obtained one or more databases to a format compatible to be executed by the one or more mobile computing devices;

stabilizing a web serving by the one or more mobile computing devices; and persisting the data in a queue by storing the identified one or more databases;

identifying one or more items in the identified one or more databases based on a received plurality of search terms, wherein the received plurality of search terms comprises a first part received from a client device and a second part automatically completed by the one or more mobile devices based on the received first part;

determining a fee for the identified one or more items based on fee setting parameters comprising a markup percentage, a cost recovery fee adjustment, a sales tax, and a service rate, wherein the determining the fee further comprises identifying a discount value for the determined fee by applying a custom label associated with a user to generate an adjusted determined fee, wherein the customer label is associated with one or more of:

delivering a message to all users associated with the custom label;

configuring one or more configurations within the mobile computing device for all users associated with the custom label, wherein the one or more configurations is one or more of a first configuration for one or more employees of a particular contractor, or a second configuration for custom prices;

applying a discount coupon or a promotional code to all users associated with the custom label; or bypassing a user account balance threshold level requirement for all users associated with the custom label; and generating a finalized work-order in real-time based on the adjusted determined fee.

20. The device as set forth in claim 19 wherein the one or more processors is further configured to execute programmed instructions stored in the memory further comprising:

determining a final invoice amount based on one or more determined fees, the determined fee adjustment, and the determined discount value; and generating an invoice associated with the generated work-order based on the determined final invoice amount.

21. The device as set forth in claim 20 wherein the one or more processors is further configured to execute programmed instructions stored in the memory further comprising:

identifying a reward based on one or more of the generated invoices; and providing one or more reward notifications indicating the identified reward.

22. The device as set forth in claim 19 wherein, upon a user account balance falling below a threshold level, the one or more processors is further configured to execute programmed instructions stored in the memory further comprising one or more of:

authorizing a payment by a user to re-establish a user account balance that exceeds the threshold level;

notifying a user of the user account balance;

allowing the mobile computing device to generate one or more work-orders until the user account balance is zero; and disallowing the mobile computing device from generating one or more work-orders until the user account balance is above the threshold level.

23. The device as set forth in claim 19 wherein the one or more processors is further configured to execute programmed instructions stored in the memory further comprising:

determining occurrence of one or more event triggers, upon generating the work-order; and providing one or more notifications associated with the one or more event triggers upon determining the occurrence of the one or more event triggers.

24. The device as set forth in claim 19 wherein determining the discount value further comprises:

determining existence of one or more of a discount coupon for the user or the custom label applied to the user; and applying the discount value to the one or more determined fees upon determining the presence of the one or more discount coupon.

25. The device as set forth in claim 19 wherein the identifying further comprises:
   determining a requirement of one or more parts for the identified one or more items;
   determining an availability of the one or more parts in a parts data warehouse;
   sending a notification to the parts data warehouse to replenish the one or more parts based on the determination.

26. The device as set forth in claim 25 further comprising:
   ordering the one or more parts from a pre-established distributor; and
   ordering the one or more parts from a different distributor for a specific employee.

27. The medium as set forth in claim 19 wherein the split format is a JSON format.

* * * * *